Jan. 17, 1967   G. M. BERTOLI   3,298,620
CASING WITH PULSATING INTERNAL WALL FOR MILLS, MIXERS
AND SIMILAR EQUIPMENT
Filed March 24, 1964   7 Sheets-Sheet 1

INVENTOR
GIOVANNI MARIA BERTOLI
By Linton and Linton
ATTORNEYS

INVENTOR
GIOVANNI MARIA BERTOLI

Jan. 17, 1967  G. M. BERTOLI  3,298,620
CASING WITH PULSATING INTERNAL WALL FOR MILLS, MIXERS
AND SIMILAR EQUIPMENT
Filed March 24, 1964  7 Sheets-Sheet 3

INVENTOR
GIOVANNI MARIA BERTOLI
By Linton and Linton
ATTORNEYS

Jan. 17, 1967 G. M. BERTOLI 3,298,620
CASING WITH PULSATING INTERNAL WALL FOR MILLS, MIXERS
AND SIMILAR EQUIPMENT
Filed March 24, 1964 7 Sheets-Sheet 7
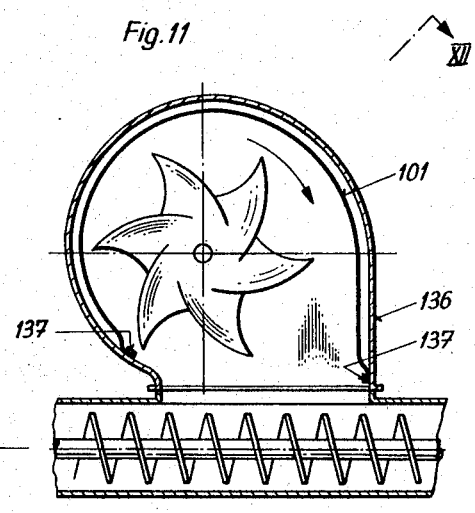
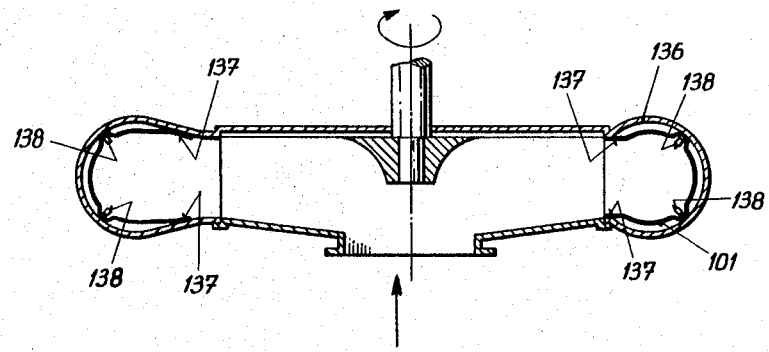
INVENTOR
GIOVANNI MARIA BERTOLI
By Linton and Linton
ATTORNEYS 3,298,620
CASING WITH PULSATING INTERNAL WALL FOR MILLS, MIXERS AND SIMILAR EQUIPMENT
Giovanni Maria Bertoli, Fagare, Treviso, Italy, assignor to Tecnopatent S.A., Balerna di Chiasso, Switzerland
Filed Mar. 24, 1964, Ser. No. 354,385
Claims priority, application Switzerland, Mar. 25, 1963, 3,777/63; Mar. 6, 1964, 2,873/64
20 Claims. (Cl. 241—285)

The object of the present invention essentially concerns the type of internal wall used in the casing holding the grinding system in a rotary cage mill or in any apparatuses wherein a reduction, mixing or any other manipulation of materials takes place which causes scaling of the walls of the enveloping casing itself.

The present invention consists essentially in providing a casing for mills, mixers and similar machinery, which is characterized by a rigid wall fitted with an interior lining formed of elastically deformable elements and by means for deforming those elements in order to remove the material which has accumulated on the lining during operation.

The type of wall according to the present invention is characterized by the elasticity of the material used (such as rubber, para-rubber, elastic synthetic materials, metals and alloys or other like materials of sufficient elasticity and resistance) and by the mobility and extensibility of the elements forming the internal surface of the wall itself. Such characteristics are transmitted to the elements in question by means of a fluid (gas or liquid), whose operational action is controlled by a motor, or by means of mechanisms which too are driven by any kind of motors.

The technique so far developed in the building of rotary cage mills or disintegrators, hammer mills, high-speed mixers or other machinery wherein the manipulation of the material takes place within casings surrounding the crashing or mixing members, has employed heretofore only containers or casings having rigid walls such as for instance of metal sheets or cast metal.

Consequently, the use of such machinery is limited in its use to the granulometric reduction or mixing of materials whose nature is such as not to cause scaling of the walls of the casing itself.

In practice the standard machines of this type operate in a substantially dry state, that is, they can only process materials in which the liquid phase is present in a reduced percentage.

The object of this invention is to provide an inside elastically deformable lining particularly suited for being used as an internal lining of the casing enclosing a grinding and/or mixing system wherein, according to the nature of the material treated or due to the conditions under which such treatment is effected, the internal walls of the casing would be subject to incrustation by the material treated. Such incrustations or scalings do not allow a continuous operation of the machine on the one part because, once the scalings have reached a certain thickness, at least one part of them come off under the effect of the weight which has built up thereby causing a lack of homogeneity in the material treated, and on the other hand because the formation of fixed wall scalings gradually lead to clogging of the machine itself.

In fact, in the grinding treatment for instance of a solid material with the simultaneous mixing with a liquid, the solid material, by partly sticking to the inner wall of the casing enclosing the grinding-mixing system, causes the treated mixture to be richer in liquid at the output than it should to correspond to that at the inlet. Subsequently, because of the loosening of part of the scaling accumulated, the mixture will now come out, richer in solid material than it should be, besides it would contain clots and agglomerated solid particles which will be harmful and undesirable for the subsequent uses of the mixture.

This makes the continuous operation of the machine impossible in case a homogeneity of the treated material is required. This phenomenon turns out to be even more harmful if, as happens in many cases, between the solid and the liquid, contemporaneously with the physical treatment, also chemical reactions take place, because, owing to the scaling, the concentration of the various phases cannot be kept constant.

A further object of this present invention is that of extending the field of application of the known machines also to the processing of material with a high degree of humidity.

As a matter of fact, thanks to this present invention, the clogging of the machine is fully avoided and its continuous operation with a homogeneous production of material treated, is assured even with very sticky material and under operational conditions which particularly favor the adhesion of the material to the inside surface of the machine casing, such as happens for instance in high speed centrifugal disintegrators and mixers working under wet conditions with a humidity of 50% and more.

In order to avoid the previously mentioned drawbacks, this present invention provides that the walls of the casing enclosing the rotary grinding and/or mixing system should be mobile in such a way as to produce a pulsing effect, a vibration or in some manner a shaking of the walls themselves.

This may be achieved through a suitable system of elastic chambers or otherwise by means of mobile walls fitted to the fixed walls of the casing, the volume of those chambers being capable of varying either by varying the quantity and physical characteristics of the fluid contained therein or by mechanical means. Such chambers, which may be tubular or otherwise, are fixed onto a normal supporting rigid casing.

The elasticity of the material used for the walls (such as rubber, para-rubber, synthetic elastic materials, metals, alloys or any other sufficiently elastic and resistant materials) absorbs to a considerable extent the force of impact of the particles thrown around by the rotating system.

The additional mobility of the walls themselves due either to the varying flow of the fluid or to the movement of mechanisms, which may be varied according to the characteristics of the materials treated, prevents the formation of any wall scaling for any type and percentage concentration of the liquid phase present in the treated materials.

Consequently, it is possible to use such machines as equipment capable of operating in the presence of any type of concentration in a liquid phase.

As a more detailed description of the invention and of the technical means by which it may find a preferred embodiment, but without the following description to be taken as limiting the scope of the patent protection with regard to other possible forms of embodiment of the invention itself, the following description is given.

Having established that the object of the present invention relates to a casing with mobile walls enclosing rotary grinding systems or other mixing, reducing systems and the like, the mobility of the walls of the casing may be achieved by means of a suitable number of chambers of changeable volume, whose walls are made of elastic material (such as rubber, para-rubber, elastic synthetic plastic material, synthetic rubber, and the like, metals, alloys and other materials of suitable elasticity, and the like) or by means of movable surface of similar material. The volume of the chambers may vary from zero to that agreeing best with the limit of the tensile stress resistance of the elastic material used for the walls of the chambers themselves.

The variation in volume and the movement of the above mentioned chambers may occur:

(a) The volumetric variation of the various chambers or the mobility of the walls according to the above established description may be achieved through mechanisms driven by any suitable kind of a motor.

(b) The mobility of the walls may be achieved also by means of the variable flow of a fluid (air, water, special liquids, special gases, etc.) introduced into the chambers from a source of fluid under pressure. The flow of the fluid may be varied by means of a motor, which varying the pressure and flow rate of the fluid to be injected into the chambers through suitable nozzles, varies the volume of the fluid itself.

The pressure variation of the fluid and its rate of flow may be programmed according to any specific norm or law, as well as left to the judgment of the operator.

Similarly there may be adjusted the mutual volumetric variations among the various chambers, when these are independent from one another.

(c) The mobility of the casing walls may be achieved, if that is sufficient, also by the sole use of a lining of highly elastic material.

The elastically deformable lining is preferably but not necessarily shaped in such a way as to constitute a substantially continuous and homogeneous lining covering the entire inside surface of the casing or a definite zone of it, so that the whole lined surface or zone be actively responsive to the pulsating action, thereby avoiding or at least reducing to a minimum the formation of dead zones where the material may build up as scales.

The object of this present invention will now be described more in detail by reference to the attached drawings of an illustrative character, wherein:

FIG. 1 schematically represents a longitudinal sectional view of a centrifugal impact disintegrator having the internal surface of the casing covered by an internal elastically deformable lining according to one embodiment conforming to this present invention.

Figure 4:
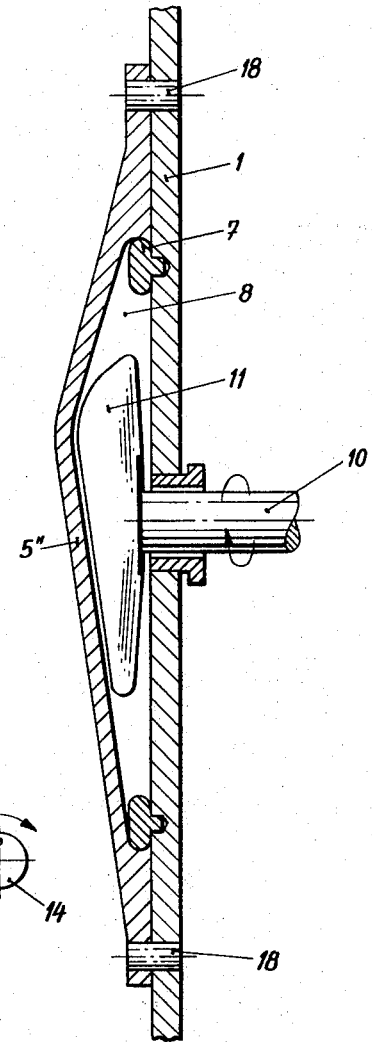
Figure 5:
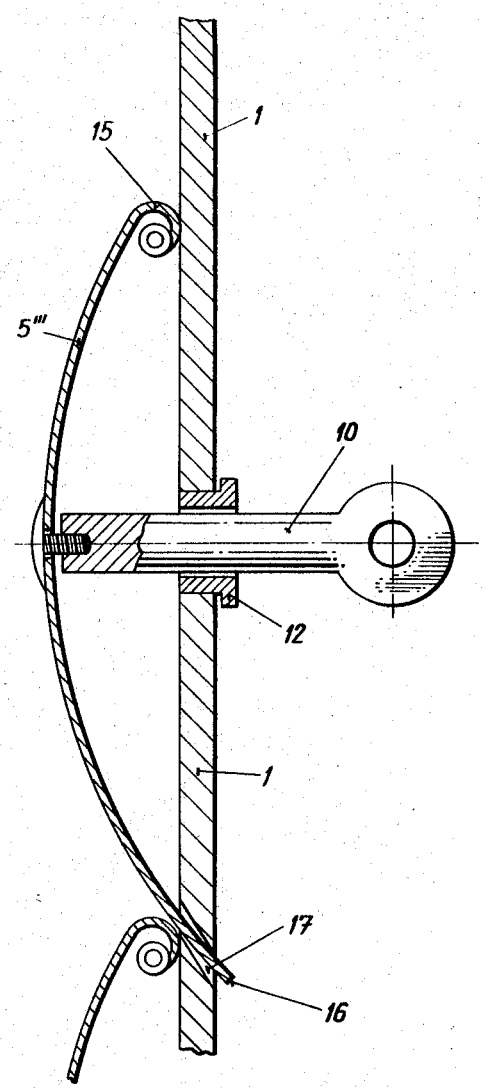
Figure 6:
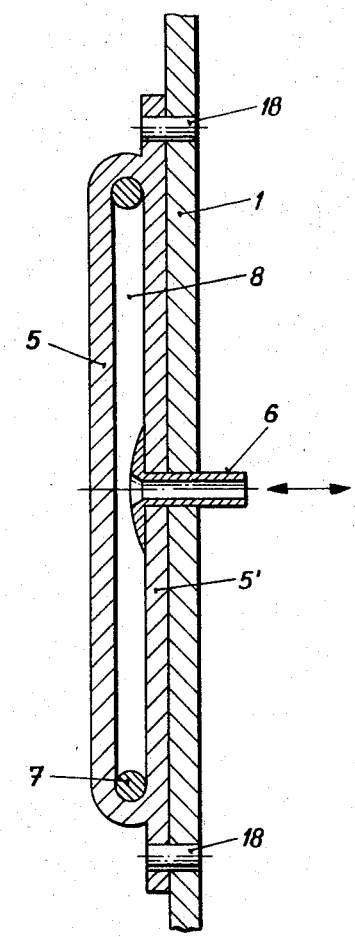

FIGS. 4–5 and 6 each represent in a schematic way another modified particular form of embodiment of the elastic lining elements.

Figure 7:
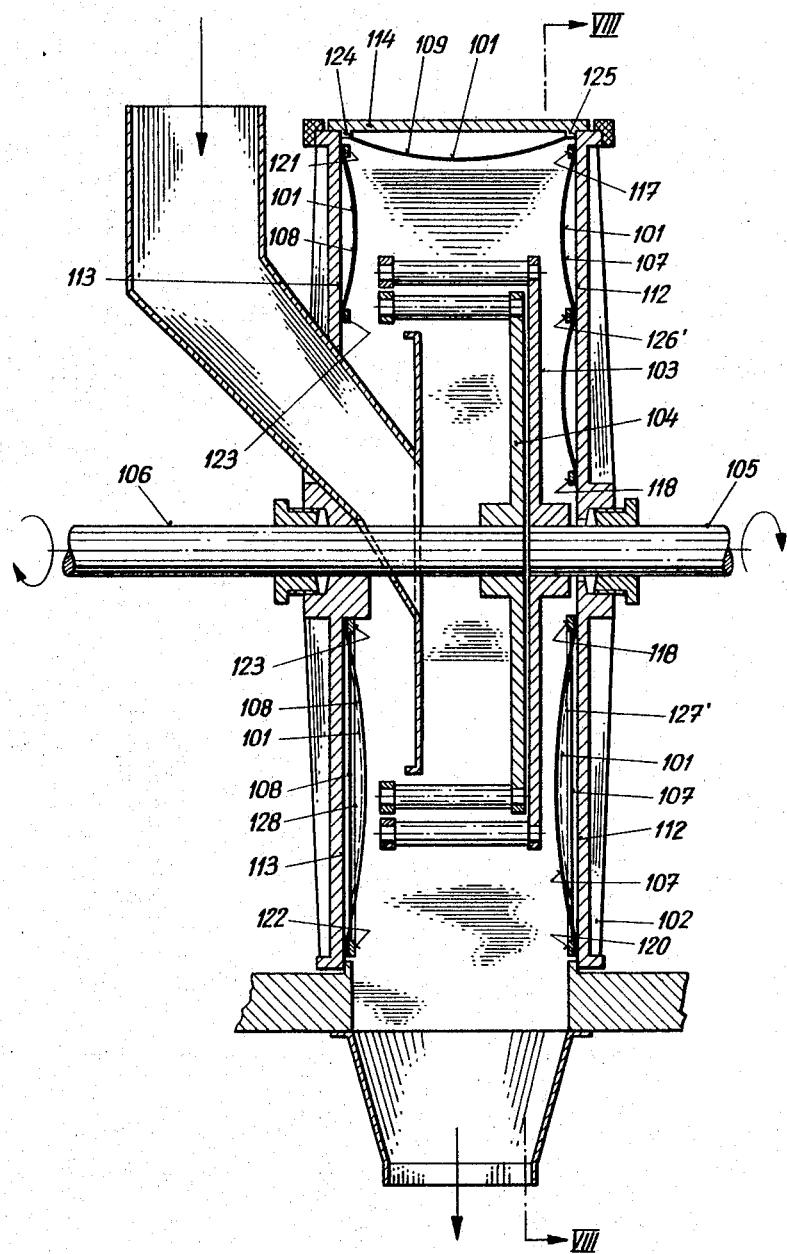

FIG. 7 represents a longitudinal sectional view of a centrifugal impact disintegrator with the inside surface of the casing provided with an internal elastically deformable lining according to another modified form of embodiment of the present invention.

Figure 8:
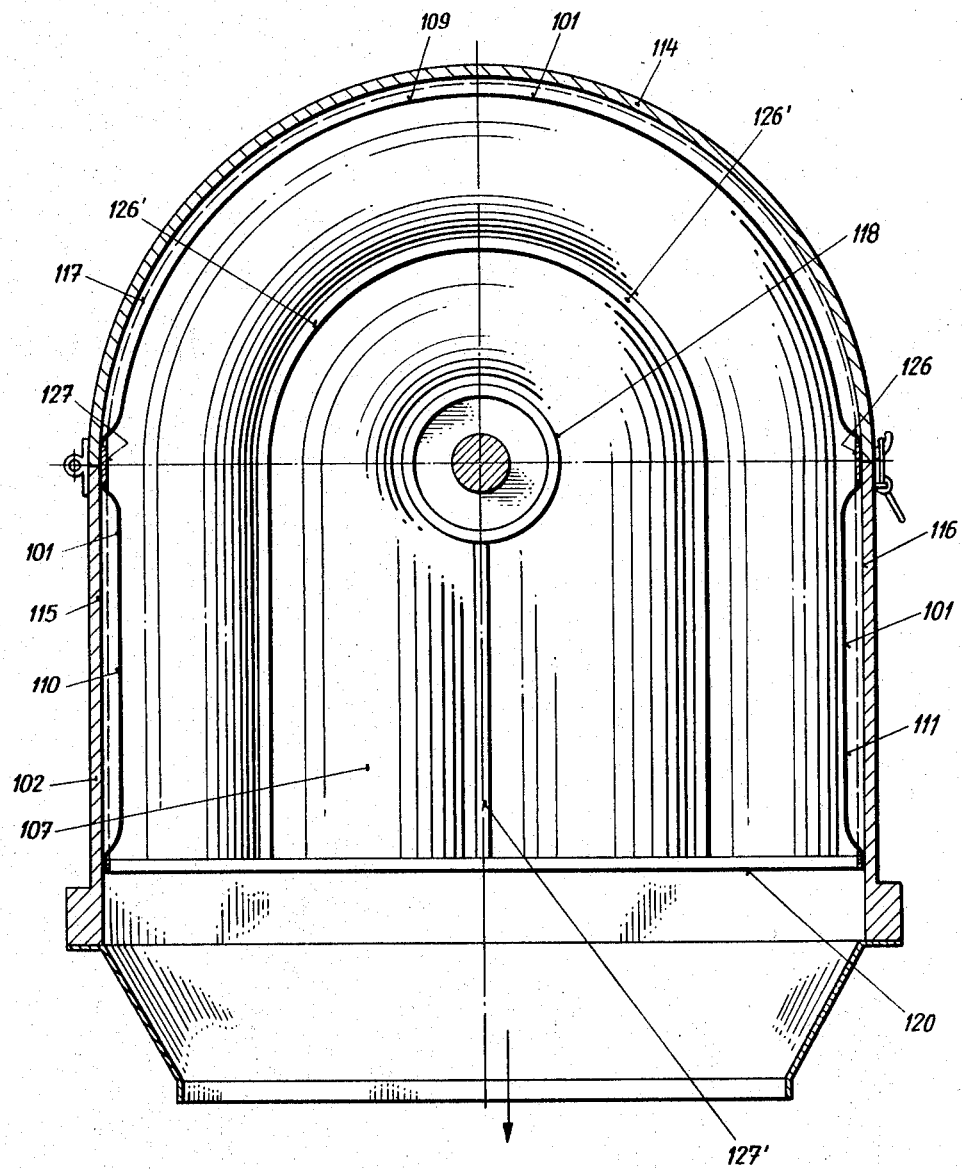

FIG. 8 represents schematically a cross-section along plane VIII—VIII of FIG. 7.

Figure 9:
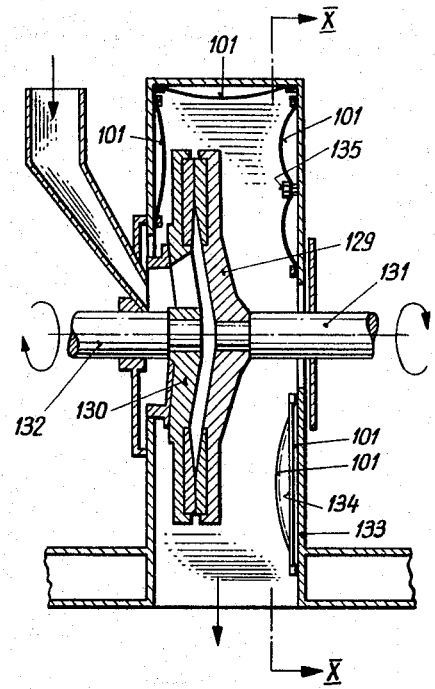

FIG. 9 represents schematically a longitudinal cross-section of a disc mill with the inside surface of the casing provided with an internal elastically deformable lining according to another modified form of embodiment of this present invention.

Figure 10:
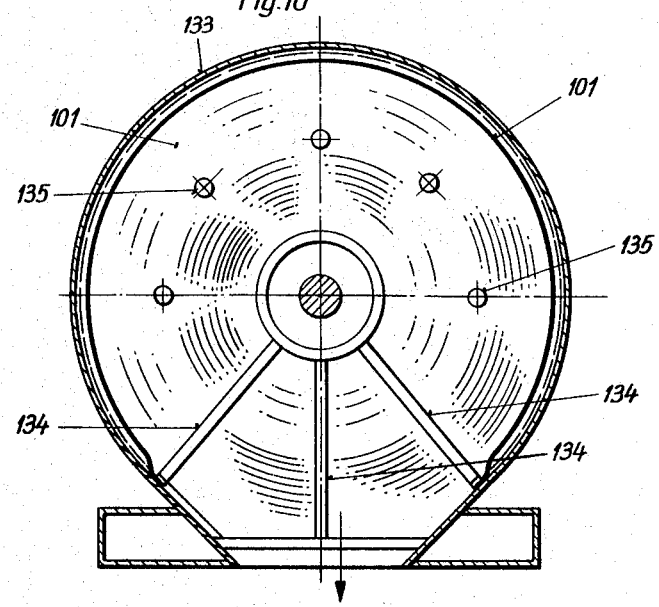

FIG. 10 schematically represents a transversal cross-section along plane X—X of FIG. 9.

FIG. 11 represents schematically a longitudinal cross-section of a centrifugal mixing pump with the inside surface of the casing provided with an internal elastically deformable lining according to a further modified form of embodiment of this present invention.

FIG. 12 represents schematically a transversal cross-section along plane XII—XII of FIG. 11.

With reference to the above figures the elastically deformable lining, object of the present invention, consists (FIGS. 1 and 6) of elastic elements 5 of abrasive resistant rubber or similar materials of a substantially rectangular shape, forming hollow bodies or double walled panels preferably prefabricated, fixed to the rigid inside surface of the fixed casing 1 enclosing the two counterrotating members 2 and 3 mounted on the two shafts 2' and 3' driven respectively by two electric motors, not represented in the drawing.

The wall of the elastic elements 5 is fixed to the inside surface of the casing by suitable known means.

These hollow elements 5, which form the elastically deformable chambers 8, are made to pulsate in order to cause the detachment of the material which, thrown against them, has stuck to these elements mainly because of its high degree of humidity.

Such a pulsating action will have a more or less high frequency and intensity depending on the ease with which the material encrusts itself on the elastic elements 5.

The feeding hopper 4 supplies the disintegrator system with the material to be processed.

Casing 1 is connected to means suitable for causing the elastic deformation of elements 5.

Figure 1:
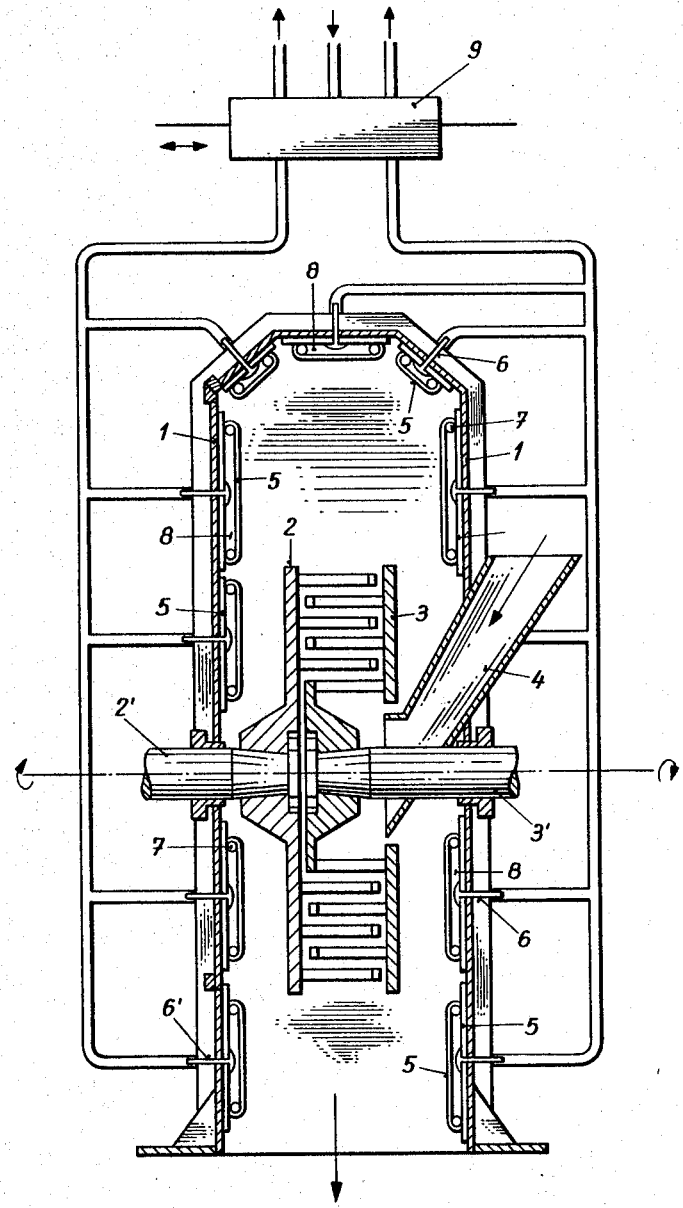

In the case of FIG. 1, elastic elements 5 are of the type similar to those shown in detail in FIG. 6. These elements consist of hollow rubber panels, fitted all along wall 5' by means of bolts 18 against the internal face of wall 1 and are supplied with a nozzle 6, passing through wall 1, for the inlet and fluid outlet of a fluid under pressure intended for deforming the panel supplied from a suitable source.

Chambers 8 and nozzles 6 are fluid tight.

For strengthening purposes, chamber 8 is provided internally with a rigid ring 7, preferably made of metal, fitted to the peripheral wall of the chamber. The various elastic panels 5 as can be seen in FIG. 1, are connected to a distributor 9 in its turn connected to a source of a compressed fluid (air, water, etc.), for instance to a compressor or a pump.

Distributor 9, either of the rotary or the reciprocating type, alternatively connects chambers 8 of the individual elements 5 with the pressure fluid source as well as subsequently with the exhaust, thereby causing the deformation of the free wall of the panel and the subsequent breaking away of the material which had accumulated on the same.

The exhausting of chambers 8 may be effected by letting the fluid flow into a container with a lower pressure or by means of any known suction system.

Figure 2:
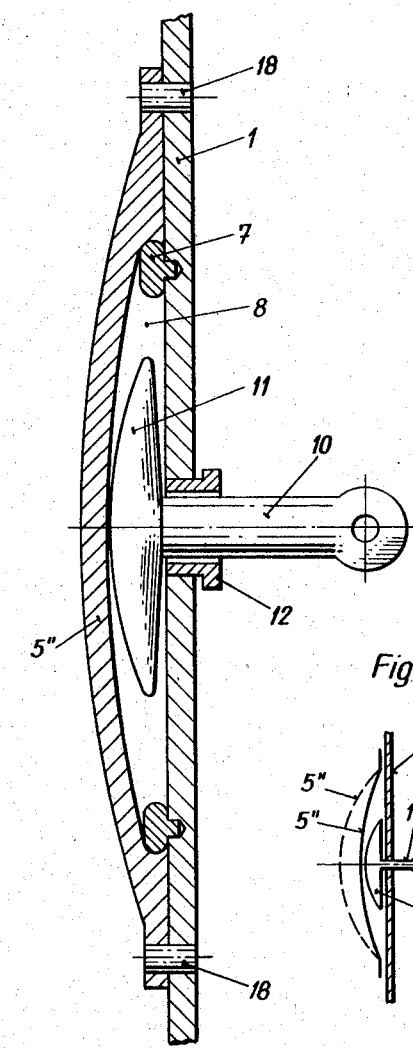
FIG. 2 represents schematically in a sectional view a particular first form of embodiment of the elastic lining elements.

FIG. 2 shows a deformable element according to another form of embodiment, which consists of a slightly convex, simple rubber-wall panel 5" fitted along the edges against wall 1 of the casing.

Figure 3:
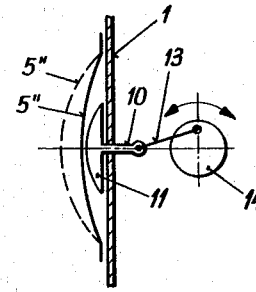
FIG. 3 represents in a schematic way a mechanical means for deforming the elastic lining element.

Between wall 1 and the panel there is placed a disc 11 shaped like a mushroom head and fixed on a stem 10 sliding in a bushing 12 placed in a hole in the wall 1. FIG. 3 shows schematically in which way the disc 11 may be operated in order to cause the elastic deformation of panel 5".

The eyelet of stem 10 is coupled to the end of a connecting rod 13 (FIG. 3) mounted on a crank 14 animated by a rotary or rocking motion.

At each turn or oscillation of crank 14, the panel is deformed, as shown by the dotted line, with a consequent increase of its curvature; these two deformations as a result of their action cause the breaking off of the material accumulated on the panel.

FIG. 4 shows element 5" identical to the preceding one but coupled to a different deforming device.

In this particular case the deformation of the rubber pannel is caused by a disc 11' having an asymmetric bulge which, following, the rotation of the disc, gradually modifies the shape of the panel, thereby achieving the desired effect, that is of breaking loose the material that got stuck to the panel.

In FIGURES 2 and 4 the strengthening ring 7 placed inside chamber 8 is fixed into place by pressure or other suitable means on the rigid wall 1 of the casing, while panel 5" is fixed to wall 1 by means of screws 18.

The pressure exerted by the compressed fluid (FIG. 6) or by disc 11 (FIG. 2) on the elastic wall 5 or 5" causes the surface variation of the wall itself as well as the volumetric variation of chamber 8 which lies between the rigid casing and the elastic wall internally superimposed.

In the case of FIG. 4, the asymmetric rotary disc causes a superficial variation of the elastic wall 5" of chamber 8 but without modifying thereby the relative volume.

For the processing of materials at high temperature the elastically deformable elements of the walls of the casing are made of suitable material capable of withstanding such high temperature (for instance also special steels).

FIG. 5, in fact, shows a lining element 5‴ of elastic metallic material, preferably steel.

The element consists in this case of a plate curved according to a substantially cylindrical surface: the upper edge 15 of plate 5‴ is rolled up on itself and is free to slide on wall 1 of the casing, while the lower edge 16 is inserted in a sliding wall in a slit 17 of wall 1. Stem 10, sliding in a bushing 12 inserted in a hole in the wall 1, is fixed by its end to the center of the plate 5‴ and, operated for instance by a mechanism similar to that shown in FIG. 3 or by a hydraulic or pneumatic unit, it will at a certain established frequency straighten the plate, thereby causing the breaking off of the material which encrusted itself on it.

There could also be a plate with both, edges rolled up or both placed in a sliding way in a slit; it would also be possible to fix one of the edges to wall 1 with a hinge, leaving a certain freedom of movement to lower edge 16 of the plate.

According to the present invention, the pulsating chambers represented in FIGURES 1 and 6 may also be at least partly connected to each other in such a way that the feeding of the pulsating fluid may be effected through one chamber which serves all the other intercommunicating chambers.

This intercommunicability between the various chambers may be achieved by means of any suitable connecting system, such as small pipes of an elastic material and the like, and also by conveniently throttling down a chamber in such a way as to obtain several intercommunicating chambers.

The same thing may be done by using the panels of FIGURES 2 and 4 in case these are hermetically fixed to the fixed wall of the casing and their pulsating action be obtained through a fluid.

Several other modified forms of embodiment of several pulsating chambers intercommunicating with each other are shown respectively for illustrative purposes in FIGURES 7, 8, 9, 10, 11 and 12.

The elastically deformable lining always according to the present invention, consists (see FIG. 7) of an elastic membrane 101 of elastically deformable material, of suitable thickness, such as for instance abrasion-resistant rubber, fixed to the inside walls of the fixed casing 102 enclosing the disintegrating system formed by the two counter-rotating cages 103 and 104 respectively mounted on the two shafts 105 and 106, (disintegrator of the "cage will" type).

This membrane 101 covers substantially the whole internal surface of casing 102 and consists of five sections which in FIGS. 7 and 8 are respectively marked 107, 108, 109, 110 and 111.

Sections 107 and 108 are fixed to the two inside side walls of the casing, respectively marked 112 and 113; section 109 is fixed to the internal surface of the movable lid 114 while sections 110 and 111 are fixed to the transversal inside walls 115 and 116.

Each section of this membrane is hermetically sealed to the respective internal surface of the casing along its edges, in such a way as to form with the corresponding internal surface of the casing a single hermetically closed chamber.

Section 107 of the membrane is hermetically sealed to wall 112 of the casing along the edges 117, 120 and 118 (FIGS. 7 and 8) of the section itself which has the shape of a crown substantially circular.

This hermetic sealing is achieved by means of screwed on strips of rigid material tightening down the edges of the elastic material of the membrane section against the surface of the rigid wall with the interposition of suitable seals or other suitable means.

In the same way is fixed to wall 113 the membrane section 108 along the edges 121, 122 and 123; to lid 114 the section 109 along edges 124, 125, 126 and 127 and to the transversal walls 115 and 116 the relative membrane sections 110 and 111 along the corresponding edges which for clearness sake are not reproduced in the drawing.

Each of the elastic chambers thus formed is inflated, and alternately deflated during the operation of the disintegrator by a fluid which is fed to the chambers themselves at a variable pressure so as to generate a pulsating action of the chambers, which action hinders the formation of deposits and scales by the material treated on the inside surfaces of the disintegrator.

In the drawings the feeding and discharging means and devices for the fluids inside the chambers have not been illustrated for reasons of simplicity.

In order to avoid an excessive deformation of the elastic pulsating chambers, these are partially throttled down by means of strips of rigid material 126, 127, 128 conveniently placed and rigidly fixed to the fixed walls of casing 102 by known means such as screws and gaskets.

In this way each pulsating chamber becomes subdivided into multiple pulsating and intercommunicating chambers which are more efficient inasmuch as the material adhering to them comes off not only because of the drawing off effect but also under the effect of the compression to which the material is subjected in the throttled zones.

These throttlings may be achieved also in other ways, such as for instance illustrated in the modification of FIGURES 9 and 10 where a friction counter-rotating disc mill with the discs 129 and 130 mounted on shafts 131 and 132 is represented.

Casing 133, enclosing the grinding system, is fitted with a lining 101 similar to that described previously wherein, however, the throttling of the pulsating chambers besides being obtained by the rigid strips 134 is also achieved by means of quiltings or retaining or fastening means 135.

Such quiltings may be obtained by means of screws and gaskets which either rigidly or with a certain clearance fix a few points of the elastic wall 101 to the rigid inner walls of the stationary casing 133, or they are achieved through similar systems.

Another example of a modified form of embodiment of the multiple intercommunicating pulsating walls is represented in FIGURES 11 and 12, wherein a centrifugal mixing pumps is represented in which the elastic lining 101, fixed to the casing 136, along its edges 137, is subdivided into multiple chambers by means of rigid strips 138, which by means of suitable gaskets subdivide the chambers hermetically with the exception of a few ports which allow the activating fluid to flow from one chamber to the other.

The lining, which is the object of the present invention, should not be considered applicable limitatingly to the types of mills or mixers which are shown for illustrative purposes in the attached drawings, but may also be applied with considerable practical and economical advantages to other types of machines suitable for grinding or disintegrating or mixing materials, which either because of their nature or for particular humidity conditions under which they are processed, do result in more or less thick pastes, or in more or less concentrated suspensions or dispersions which by encrusting the inner surfaces of the stationary casing, hinder the continuous operation of the machines, making it necessary to stop them at frequent intervals in order to clean their interior.

The present invention allows, furthermore, while avoiding the above described drawbacks, to achieve at the same time in one single phase, the grinding or disintegrating of a solid phase and the mixing of this with a liquid phase, thereby fully making use of in case that during the mixing of the various phases chemical reactions or endothermic physical phenomena were to take place, the heat developed during the simultaneous disintegration, in order to prime and start such reactions with a considerable operating and practical advantage.

The continuous grinding of a solid material in the presence of a liquid phase, made possible by the present invention, makes it also possible to achieve very considerable savings (of the order of 40%) on the wear and tear of the grinding members.

As a matter of fact, such grinding members, which may be the pins of a disintegrator with counter rotating cages fitted with one or more concentric rows of pins, the surface of the counter-rotating discs of a friction mill; the hammers of an inpact hammer grinder, the fans of the turbine of a centrifugal mixing pump or any other grinding element, are subjected to strong wear and must therefore be often replaced, particularly so when the material to be grinded has a high Mohs degree of hardness.

Furthermore it must be noted that the grinding of a solid material in the presence of a liquid allows a better exploitation of the grinding members in as much as the liquid phase, by removing the heat developing from the impact or friction of the solid material against said grinding organs, prevents that these latter reach too high temperatures, which would reduce within a short lapse of time the resistance properties of the members themselves.

These objects and advantages of our invention are furthermore illustrated by the following examples.

EXAMPLE 1

In a mill of the type with counter-rotating discs as schematically illustrated in the modifications of FIGURES 9 and 10, being however of the prior art type however lacking in pulsating walls on the inner surface of the casing, there have been introduced: iron ore powder ($Fe_3O_4$ content: 63.8%), $H_2O$.

Said materials have been metered so that the following percentage by weight is obtained at the milling system feeding: iron ore powder, 85%; $H_2O$, 15%.

Feeding throughput was of 550 kg./h.

After 2 minutes 30 seconds of running, the machine has been stopped, the lid opened and a thickness of about 1 cm. of thick material has been measured on the central portion of the lid itself.

After additional 10 minutes 20 seconds of running under said conditions, at the discharge remarkable clots of thick material have been noticed within the discharged fluid mass.

After 38 minutes 25 seconds of running since beginning, the machine has stopped owing to the operation of the safety device (overload cut out). After lid opening, the machine proved to be nearly completely clogged.

The same test carried out on an identical mill, however provided with pulsating walls built according to the present invention, as schematically indicated in the acompanying figures, has shown that the machine runs continuously for an extended period while discharging an homogeneous mixture.

After 20 hours of continuous running the lid has been opened in order to control the condition of the discs and a negligible surface incrustation has been observed on the lid.

EXAMPLE 2

In the same prior art mill whereof at Example 1 there have been introduced: sand ($SiO_2$ content: 95%); $Ca(OH)_2$ (CaO content: 70%); CaO(CaO content: 94%); $H_2O$.

Said materials have been metered so that at the milling system feeding the following percentage composition by weight is obtained:

| | Percent |
|---|---|
| Sand | 64 |
| $Ca(OH)_2$ | 6.4 |
| CaO | 6.4 |
| $H_2O$ | 23.2 |

Feeding throughput was of 495 kg./h.

After 1 minute 30 seconds of running only kg. 6.3 mixture on the fed 12.375 kg. were discharged at mill outlet.

After stopping the machine and inspecting the lid inner surface a thickness of about 1.8 cm. of thick material has been observed on the central portion of the lid itself.

After additional 3 minutes of running under said conditions considerable clots of thick material have been noticed within the discharged fluid mass.

After 28 minutes of running since beginning the machine has been stopped inasmuch as the unhomogeneity of the discharged material was so great as to prevent the utilization thereof.

The same test carried out in an identical mill, however provided with pulsating walls built according to the present invention, as schematically illustrated in the enclosed drawings, has proved that the machine runs continuously while discharging a homogeneous mixture.

After 35 hours of continuous running the lid has been opened and thereupon a negligible surface incrustation has been observed.

EXAMPLE 3

In a disintegrator of the "cage mill" type schematically illustrated in FIGURES 7, 8 lacking however of of pulsating walls on the casing inner surface and with each counter-rotating cage provided with three rows of pins, there have been introduced: sand ($SiO_2$ content, 95%); $Ca(OH)_2$(CaO content, 70%); $H_2O$.

Said materials have been metered so that at the disintegrator system feeding the following percentage composition by weight is obtained:

| | Percent |
|---|---|
| Sand | 62 |
| $Ca(OH)_2$ | 9.3 |
| $H_2O$ | 28.7 |

Feeding throughput was of 720 kg./h.

After 40 seconds of running with the prior art device only kg. 1.850 mixture on the fed 8 kg. have been discharged at disintegrator outlet.

After stopping the machine and opening the lid a thickness of about 1 cm. of thick material on the central portion of the lid itself has been measured.

After additional 2 minutes 40 seconds of running under said conditions considerable clots of thick material have been noticed within the discharged fluid mass.

After 25 minutes of running since beginning, the machine has been stopped inasmuch the unhomogeneity of the discharged material was so great as to prevent its utilization.

The same test carried out on an identical disintegrator however provided with pulsating walls according to the present invention, as schematically illustrated in the enclosed drawings, has shown that the machine runs continuously while discharging an homogeneous mixture.

After 50 hours of continuous running with the device of the present invention the lid has been opened in order to control the condition of the pins and a negligible surface incrustation on the lid has been observed.

EXAMPLE 4

In the same disintegrator of the prior art whereof at Example 3 there have been introduced: clay sand ($SiO_2$ content 57%, clay 15%); $Ca(OH)_2$ (CaO content 70%); $H_2O$.

Said materials have been metered so that the following percentage composition by weight is obtained at the disintegrator system feeding:

| | Percent |
|---|---|
| Clay sand | 70 |
| Ca(OH)$_2$ | 7 |
| H$_2$O | 23 |

Feeding throughput was of 430 kg./h.

After 3 minutes of running the machine has been stopped and the lid opened: a thickness of about 3.5 cm. of thick material on the central portion of the lid itself has been measured.

After additional 1 minute 40 seconds of running under said conditions considerable clots of thick material have been noticed within the discharged fluid mass.

After 21 minutes 40 seconds of running since beginning with the prior art device the machine has stopped by intervention of the safety device (overload cut out). By opening the lid the machine has proved to be nearly clogged.

The same run carried out on an identical disintegrator however provided with pulsating walls built according to the present invention, as illustrated in the enclosed drawings, has shown that the machine runs continuously while discharging an homogeneous mixture.

After 40 hours of continuous running the lid has been opened in order to control the condition of the pins and a negligible surface incrustation has been observed on the lid.

EXAMPLE 5

In an industrial disintegrator of the prior art of the same type whereof at Example 3, wherein the disintegrator system is formed by two counter-rotating cages each equipped with three concentric rows of pins rotating at the rate of 1000–1500 r.p.m. and so arranged as between two successive rows of pins, by mounted cages, a free distance of about 10–20 mm. follows, and with pins sized and positioned so as to obtain an homogeneous treatment of the whole introduced material the same materials whereof at Example 3 have been fed, metered as to obtain the following percentage composition by weight: sand 65%; Ca(OH)$_2$ 6.5%; CaO 6.5%; H$_2$O 22%.

Feeding throughput of 7.5 t./h.

After 6 minutes 10 seconds of running the machine has been stopped and by inspecting the lid inner surface a thickness of about 3.5 cm. of thick material has been observed on the central portion of the lid itself.

After further 3 minutes 20 seconds of running under said conditions considerable clots of thick material have been noticed within the discharged fluid mass.

After 15 minutes 20 seconds of running since beginning with the prior art device the machine has been stopped inasmuch as a so great unhomogeneity of the discharged material occurred as to prevent the utilization thereof.

The same test carried out in an identical disintegrator equipped with pulsating walls built according to the present invention, as schematically illustrated in the enclosed drawings, has shown that the machine runs continuously while discharging an homogeneous mixture.

After 100 hours of continuous running the lid has been opened in order to control the condition of the pins and a negligible surface incrustation on the lid has been observed.

EXAMPLE 6

In the disintegrator of the prior art whereof at Example 3 there have been introduced: kaolin rock, H$_2$O.

Said materials have been metered so that the following percentage by weight is obtained at disintegrator system feeding: kaolin rock, 70% H$_2$O, 30%.

Feeding throughput was of 500 kg./h.

After 1 minute 20 seconds of running the machine has been stopped, the lid opened and the inner surface of the same has been inspected while noticing an incrustation of about 1.5 cm. of thick material on the central portion of the lid itself.

After further 3 minutes 40 seconds of running under said conditions considerable clots of thick material have been noticed within the dicharged fluid mass.

After 22 minutes 10 seconds of running since beginning with the prior art device the machine has been stopped inasmuch as the unhomogeneity of the discharged material was so great as to prevent the utilization thereof.

The same test carried out on an identical disintegrator however equipped with pulsating walls built according to the present invention, as illustrated schematically in the enclosed drawings, has shown that the machine runs continuously while discharging an homogeneous mixture.

After 45 hours of continuous running the lid has been opened in order to control the state of the pins and a negligible surface incrustation on the lid has been observed.

EXAMPLE 7

In the disintegrator of the prior art whereof at Example 3 there have been introduced: rock salt, sand (SiO$_2$ content 95%), asbestos, H$_2$O.

Said materials have been metered as to obtain the following percentage composition by weight at the disintegrator system feeding:

| | Percent |
|---|---|
| Rock salt | 23.3 |
| Sand | 46.5 |
| Asbestos | 11.6 |
| H$_2$O | 18.6 |

Feeding throughout was of 600 kg./h.

After 1 minute 30 seconds the machine has been stopped, the lid opened and the inner surface of the same inspected while noticing an incrustation of about 1.5 cm. of thick material on the central portion of said lid.

After further 3 minutes of running under said conditions remarkable clots of thick material have been noticed within the discharged fluid mass.

After 20 minutes 35 seconds since the beginning with the prior art device the machine has been stopped inasmuch as the unhomogeneity of the discharged material was so great as to prevent the utilization thereof.

The same test carried out on an identical disintegrator however provided with pulsating walls built according to the present invention, as illustrated schematically in the enclosed drawings, has shown that the machine runs continuously while discharging an homogeneous mixture.

After 70 hours of continuous running the lid has been opened in order to control the state of the pins and a negligible surface incrustation has been noticed on the lid itself.

The material wherewith the elastically deformable lining which is object of the present invention may be of what ever kind provided that it is elastically deformable under the action of fluids (gases or liquid) which are admitted into the elastic chambers or under the action of the mechanical members generating the pulsating motion and provided that are resistant to said actions as well as to the abrasive action of the treated solid material which is thrown at high speed against its surface.

When the material to be treated is particularly hard, for the inner lining of the casing particular elastic materials resistant to abrasion may be employed, as the antiabrasive rubbers, plastic materials, metallic materials or other elastic materials reinforced with threads or layers of nylon, cotton, hemp, steel or the like.

It is to be noticed that elastic elements realized in the various manners above set forth may be also each other combined upon a same wall in order to improve the overall effect.

In the case of rubber elements deformed by a fluid, this deformation could be also achieved, without distributor, by varying the throughput and the pressure of the fluid admitted by means of a pump into the cavities of the panels.

In the case of the mechanical means as well in that of the hydraulic or pneumatic means the law of elastic deformation of elements may assume whatever course. Deformation can be simultaneous in all the elements or subsequent according to whatever order. As already mentioned, the frequence too of the deformations may be different as the case may be.

This description refers obviously to single embodiments of the present invention and is purely illustrative, whatever other variation or realization coming within the scope of the present invention, shall be considered as pertaining to the scope of the present invention; for instance the numbers, the form and the arrangement of the throttle elements of the elastic membrane may be varied depending on the requirements.

I claim:

1. A stationary casing for disintegrators and the like, rotating working means contained in said casing, characterized in an elastically deformable lining made up of elastic material applied to the inner walls of said casing, said casing, preferably being so shaped as to constitute a substantially continuous and homogeneous lining on at least one definite zone of the inner surface of said casing itself, means adapted to deform said elastic lining being mounted adjacent to said casing in operative relation therewith and adapted to sever material accumulated on said lining.

2. A casing according to claim 1, characterized in that said elastically deformable lining is constituted of at least one element of elastic material selected from the group consisting of natural rubber, synthetic rubber, and plastic material and the like, in the form of double-walled hollow panel, said wall comprising at least one membrane and forming a fluid-tight chamber, one wall of which is fastened, preferably along its edges, to the inner wall of the stationary casing, said panel being preferably provided with a reinforcing ring of stiff, preferably metallic material, fastened inside the chamber formed by said panel.

3. A casing according to claim 1, characterized in that said elastically deformable lining is constituted of at least one element of elastic material selected from the group consisting of natural rubber, synthetic rubber, and plastic material, in the form of a single walled panel constituted of at least one membrane, said panel being fastened along its edges to the inner wall of the stationary casing and forming with said wall at least one fluid-tight chamber, said panel being preferably provided with a reinforcing ring of stiff, preferably metallic material, fastened inside the chamber formed by said panel.

4. A casing according to claim 1, characterized in that said elastically deformable lining is shaped so as to obtain at least one chamber subdivided in a plurality of chambers.

5. A casing according to claim 1, characterized in that said elastically deformable lining is shaped so as to obtain at least one chamber subdivided in a plurality of intercommunicating chambers.

6. A casing according to claim 1, and a source of fluid under pressure, and characterized in that said means adapted to deform the elastic material are constituted of at least one inlet and discharge nozzle for fluid under pressure from said source into the chamber of at least one elastically deformable element, said nozzle passing through the casing's stationary wall and being connected with said pressure fluid source preferably through a distributor adjusting in determined manner the feeding of the fluid for exerting the pulsating action.

7. A casing according to claim 1, characterized in that said elastically deformable lining is constituted of at least one element of elastic material selected from the group consisting of natural rubber, synthetic rubber, and plastic material and the like, in the form of a panel with a single wall constituted of at least one membrane, said panel being fastened along its edges to the inner wall of the stationary casing a disc positioned between the panel itself and said wall and supported by a stem crossing the wall, and mounted for deforming said panel and of fluid means selected from the group consisting of mechanical hydraulic and pneumatic means adapted for shifting axially said disc.

8. A casing according to claim 1, characterized in that said elastically deformable lining is constituted of at least one element of plastic material selected from the group consisting of natural rubber, synthetic rubber, plastic material, in the form of a panel with a single wall made up of at least one membrane, fastened along its edges to the inner wall of the stationary casing, a disc with an eccentric bulge positioned between the panel and the wall and supported by a stem crossing said wall, and mounted for deforming said panel, and of means for rotating said stem and the corresponding disc in order to modify the panel's shape.

9. A casing according to claim 1, characterized in that said elastically deformable lining is constituted of elastic elements made up of material resistant to high temperatures in order to allow the working of the material at high temperatures.

10. A casing according to claim 2, characterized in that communicating elements are provided for intercommunicating at least two of said chambers intercommunicating with each other.

11. A casing according to claim 3, characterized in that communicating elements are provided for intercommunicating at least two of said chambers intercommunicating with each other.

12. A casing according to claim 5, characterized in that the subdivision of the chamber into a plurality of intercommunicating chambers is achieved by means of partial throttles of said chamber with strips of stiff material, said strips being unitary with the stationary wall of the casing.

13. A casing according to claim 5, characterized in that the subdivision of the chamber into a plurality of intercommunicating chambers is achieved by means of total throttles with strips of stiff material, said strips being unitary with the stationary wall of the casing and having at least one port of intercommunicability.

14. A casing according to claim 5, characterized in that the subdivision of the chamber in a plurality of intercommunicating chambers is accomplished by means of quilting formed fastening means.

15. A casing according to claim 9, characterized in that said elements resistant to high temperature are constituted of at least one curved steel plate of which at least two edges thereof are engaged wih the stationary wall, said plate being centrally provided with a stem crossing said wall, and means selected from among mechanical, hydraulic and pneumatic means and mounted for shifting axially said stem in order to deform elastically said plate.

16. A disintegrator, comprising a stationary casing, rotating working means enclosed in said casing, characterized in that the inner surface of said stationary casing is provided with an elastically deformable lining covering substantially the whole inner surface, said lining being constituted of at least one panel made up of elastic material, fixed along its edges to a definite zone of the inner surface of said casing and constituting a fluid-tight chamber, a source of fluid under pressure, said chamber being provided with at least one nozzle crossing the wall of said stationary casing and connecting said chamber with said source of fluid under pressure which causes a pulsating action of said lining and prevents the material treated in the machine from adhering to said lining.

17. A distintegrator, according to claim 16, characterized in that said panel is a double walled hollow panel.

18. A disintegrator, according to claim 16, characterized in that said panel is a single walled panel.

19. A distintegrator, according to claim 16, characterized in that said panel is substantially throttled at several points by means of retaining means which in turn fasten further said panel to the inner surface of the stationary casing.

20. A disintegrator, according to claim 16, characterized in that said panel is provided with a reinforcing ring of stiff, preferably metallic material, fastened inside the chamber formed by said panel along its edges.

References Cited by the Examiner
UNITED STATES PATENTS

| | | | |
|---|---|---|---|
| 2,603,832 | 7/1952 | Clark | 241—182 X |
| 2,711,557 | 6/1955 | Russell. | |
| 2,812,541 | 11/1957 | Webster | 241—182 X |

ROBERT C. RIORDON, *Primary Examiner.*

D. KELLY, *Assistant Examiner.*